(12) United States Patent
Willey (10) Patent No.: US 8,242,444 B2
(45) Date of Patent: Aug. 14, 2012

(54) GANGED FOCUS MECHANISM FOR AN OPTICAL DEVICE

(75) Inventor: Charles D. Willey, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 660 days.

(21) Appl. No.: 12/424,174

(22) Filed: Apr. 15, 2009

(65) Prior Publication Data
US 2010/0264310 A1 Oct. 21, 2010

(51) Int. Cl.
*H01L 31/00* (2006.01)
(52) U.S. Cl. .................................................. 250/330
(58) Field of Classification Search .................. 250/330
See application file for complete search history.

(56) References Cited

U.S. PATENT DOCUMENTS

| | | | |
|---|---|---|---|
| 2,727,431 A | 12/1955 | Blatherwick | |
| 4,227,456 A * | 10/1980 | Sato | 101/291 |
| 4,507,073 A * | 3/1985 | Shelton | 425/466 |
| 5,606,458 A | 2/1997 | Fergason | |
| 5,886,822 A | 3/1999 | Spitzer | |
| 6,147,805 A | 11/2000 | Fergason | |
| 6,483,647 B2 | 11/2002 | Zadravec | |
| 6,560,029 B1 | 5/2003 | Dobbie et al. | |
| 6,787,747 B2 | 9/2004 | Specht et al. | |
| 7,116,491 B1 | 10/2006 | Willey | |
| 2004/0042086 A1 | 3/2004 | Beystrum et al. | |

FOREIGN PATENT DOCUMENTS

| | | |
|---|---|---|
| FR | 2 008 811 A | 1/1970 |
| JP | 07 072368 A | 3/1995 |
| JP | 10 142520 A | 5/1998 |

OTHER PUBLICATIONS

Search Report and Written Opinion of PCT/US2010/028231, Jun. 6, 2010.

* cited by examiner

*Primary Examiner* — David Porta
*Assistant Examiner* — Shun Lee
(74) *Attorney, Agent, or Firm* — RatnerPrestia (57) ABSTRACT

An optical device for viewing an image is provided. The optical device includes two optical channels, each optical channel including an image detector assembly and a complimentary objective lens assembly spaced by a respective distance from the image detector assembly. A focus mechanism is either directly or indirectly coupled to both image detector assemblies. The focus mechanism includes two threaded segments having an unequal thread pitch. Each image detector assembly includes a mating threaded segment that is threadedly coupled to a respective threaded segment of the focus mechanism such that rotation of the focus mechanism causes translation of both image detector assemblies at unequal rates by virtue of the unequal thread pitch of the threaded segments of the focus mechanism.

7 Claims, 10 Drawing Sheets

GANGED FOCUS MECHANISM FOR AN OPTICAL DEVICE

FIELD OF THE INVENTION

The present invention relates to a ganged focus mechanism for use with an optical device, particularly suited for night vision applications.

BACKGROUND OF THE INVENTION

Night vision systems are used in a wide variety of military, industrial and residential applications to enable sight in a dark environment. For example, night vision systems are utilized by military aviators during nighttime flights or military soldiers patrolling the ground. Security cameras use night vision systems to monitor dark areas and medical instruments use night vision systems to alleviate conditions such as retinitis pigmentosis (night blindness).

Conventional image enhancement night vision equipment utilize an Image Intensifier ($I^2$) to amplify an image. The image intensifier collects tiny amounts of light in a dark environment, including the lower portion of the infrared light spectrum, that are present in the environment but may be imperceptible to the human eye. The image intensifier amplifies the light so that the human eye can perceive the image. The light output from the image intensifier can either be supplied to a camera, external monitor or directly to the eyes of a viewer. The image intensifier devices are commonly employed in goggles, i.e. a monocular or binocular, that are worn on a user's head for transmission of the light output directly to the viewer.

Image enhancement night vision equipment utilizes available light such as starlight and moon light. Although the image enhancement equipment will work in very reduced lighting, it may not work as well in environments of absolute darkness, such as caves or caverns. Furthermore, image enhancement equipment effectiveness may be reduced by battlefield obscuration such as smoke, fog, rain, dust, and foliage. For those reasons, standard night vision devices may be enhanced with the addition of thermal imaging, i.e. infrared (IR) information.

Whereas conventional night vision devices employing image intensifiers can only see visible wavelengths of radiation, the enhanced system provides additional situational awareness by providing infrared (i.e. heat) information to the image. A typical scenario where this might be important is where a camouflaged person cannot be seen with an image intensifier device. However, with the addition of infrared information to the same image, the camouflaged person's heat signature is visible.

The enhanced night vision device commonly includes two channels, each channel including an image detector for transmitting a scene image to the user. The first channel includes a thermal camera (i.e., an infrared detector), for example, and a complementary objective lens to transmit a scene image in a first spectral band. The second channel includes an image intensifier camera, for example, and a complementary objective lens to transmit the same scene image in a second spectral band. A processing module within the night vision device fuses the images together and superimposes the images on each other. Such a device is disclosed in U.S. Pat. No. 6,560,029 which is incorporated herein by reference in its entirety.

To change the focus of each channel of the enhanced night vision, the end user adjusts the relative distance between an image detector and its complimentary objective lens. U.S. Pat. No. 7,116,491 to Willey et al., which is incorporated by reference herein, discloses a focusing mechanism that is configured to simultaneously adjust focus of two optical channels by simultaneously translating both image detectors relative to their respective objective lenses.

In various night vision devices, such as that described in U.S. Pat. No. 7,116,491 (the '491 patent), each image detector moves relative to its complementary objective lens, or vice versa. In a common arrangement, a bore that forms part of an image detector translates over an exterior revolved surface of a cylinder that forms part of a complimentary objective lens, or vice versa. The amount of clearance between the cylinder and the bore is dictated by the accuracy of the machines that form the bore and the cylinder. The amount of clearance between the cylinder and the bore is tailored such that the cylinder can freely slide within the complimentary bore, while 'play,' i.e., clearance, between the cylinder and the bore is limited. In multi-channeled systems, excessive play between the bore and the cylinder may be detrimental because the play may manifest itself as error between overlaid images (i.e., pixel matching). Maintaining a tight tolerance to limit excessive play while permitting the bore to freely slide over the cylinder is a relatively expensive proposition. There exists a need to improve upon the focus mechanism of a multi-channel optical system in the interest of cost, manufacturability and performance.

Various multi-channel night vision devices, such as that described in the '491 patent, do not include provisions for adjusting the relative focus of the channels, i.e., the focus of one channel with respect to the focus of another channel. In the '491 patent, the focus of both channels is adjusted simultaneously by rotating a single knob. It is not possible to adjust the focus of one channel independently of the focus of another channel without disassembling the night vision device. It would be beneficial to include provisions for adjusting the relative focus of each channel without disassembling the night vision device in the interest of usability.

SUMMARY OF THE INVENTION

According to one aspect of this invention, an optical device for viewing an image is provided. The optical device comprises two optical channels positioned adjacent one another, each optical channel including an image detector assembly and a complimentary objective lens assembly spaced by a respective distance from the image detector, wherein the objective lens assembly includes an objective lens and the image detector assembly includes an image detector. A focus mechanism is either directly or indirectly coupled to both image detector assemblies or both objective lens assemblies, wherein the focus mechanism is configured to adjust the respective distance between the image detector and the objective lens of each optical channel. The focus mechanism comprises a rotatable member having two threaded segments, wherein the threaded segments of the focus mechanism have an unequal thread pitch. Either each image detector assembly or each objective lens assembly includes a mating threaded segment that is threadedly coupled to a respective threaded segment of the rotatable member such that rotation of the rotatable member adjusts the respective distance between the image detector and the objective lens of each optical channel at an unequal speed by virtue of the unequal thread pitch of the focus mechanism.

According to another aspect of this invention, each objective lens assembly includes a translation surface that is positioned to face a translation surface of its complimentary image detector assembly. A resilient member is positioned to bias the translation surface of each image detector assembly toward a translation surface of its complimentary objective lens assembly. Upon translation of each objective lens with respect to its complimentary image detector, the resilient member biases the translation surface of each image detector assembly toward the translation surface of the complimentary objective lens such that a longitudinal axis of each image detector remains substantially parallel to a longitudinal axis of its complimentary objective lens as each image detector translates with respect to its complimentary objective lens assembly.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

The invention will next be illustrated with reference to the figures. Such figures are intended to be illustrative rather than limiting and are included herewith to facilitate explanation of the present invention. The figures are not to scale, and are not intended to serve as engineering drawings.

FIGS. 1A-1D depict one exemplary embodiment of a multiple channel optical device that is designated by the numeral "10." Multiple channel optical device 10 may be used, for example, with a man-mounted night vision monocular arrangement, such as the one illustrated in U.S. Pat. No. 6,560,029, which is incorporated herein by reference. The multiple channel optical device 10 is adapted to observe and transmit an image to a prismatic video display (not shown) positioned in front of a user's eye.

According to the exemplary embodiment of the invention illustrated in FIGS. 1A-1D, the optical device 10 includes two channels, i.e., channels 11 and 13, for detecting and transmitting a scene image. Each channel 11, 13 generally includes an objective lens for transmitting a scene image in a spectral band, an image detector, and a carriage assembly that is configured to translate the image detector with respect to the objective lens. Each image detector is fixedly mounted to a carriage assembly. In operation, translating a carriage assembly adjusts the distance between an image detector and its complimentary objective lens thereby adjusting the focus of a channel. The focus of both channels 11, 13 is simultaneously adjusted by rotating a single focus mechanism 17 which translates the carriage assemblies.

Figure 1A:
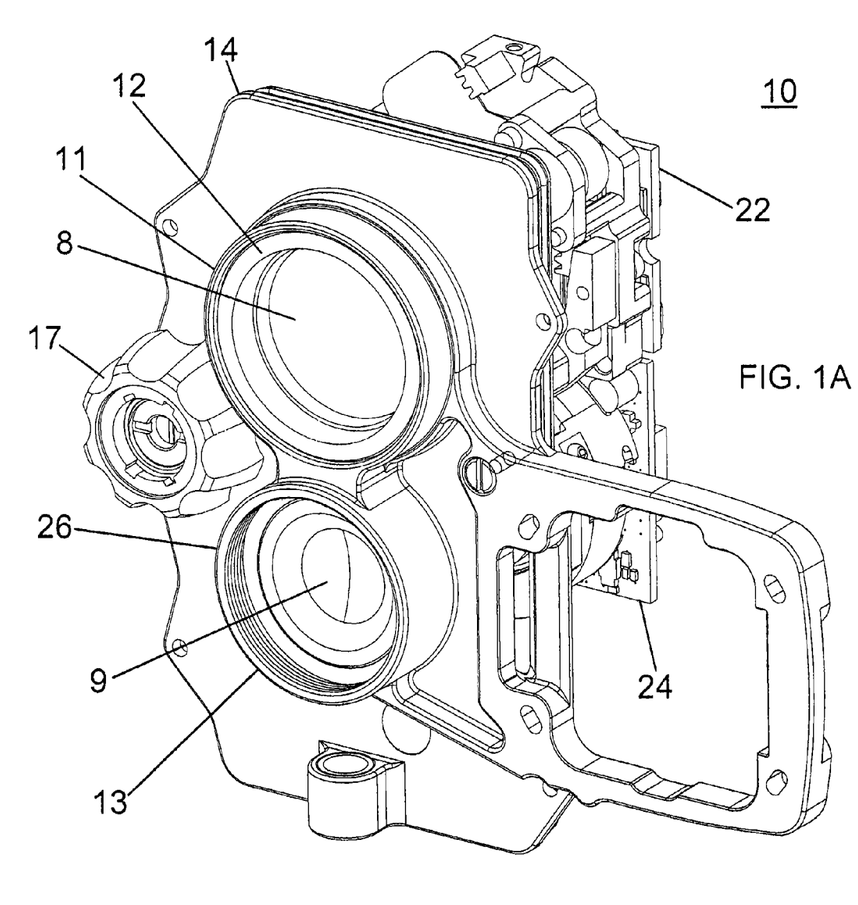
FIG. 1A is a front perspective view from the top right of an exemplary embodiment of a multi-channel night vision optical device in accordance with the present invention.
Figure 1B:
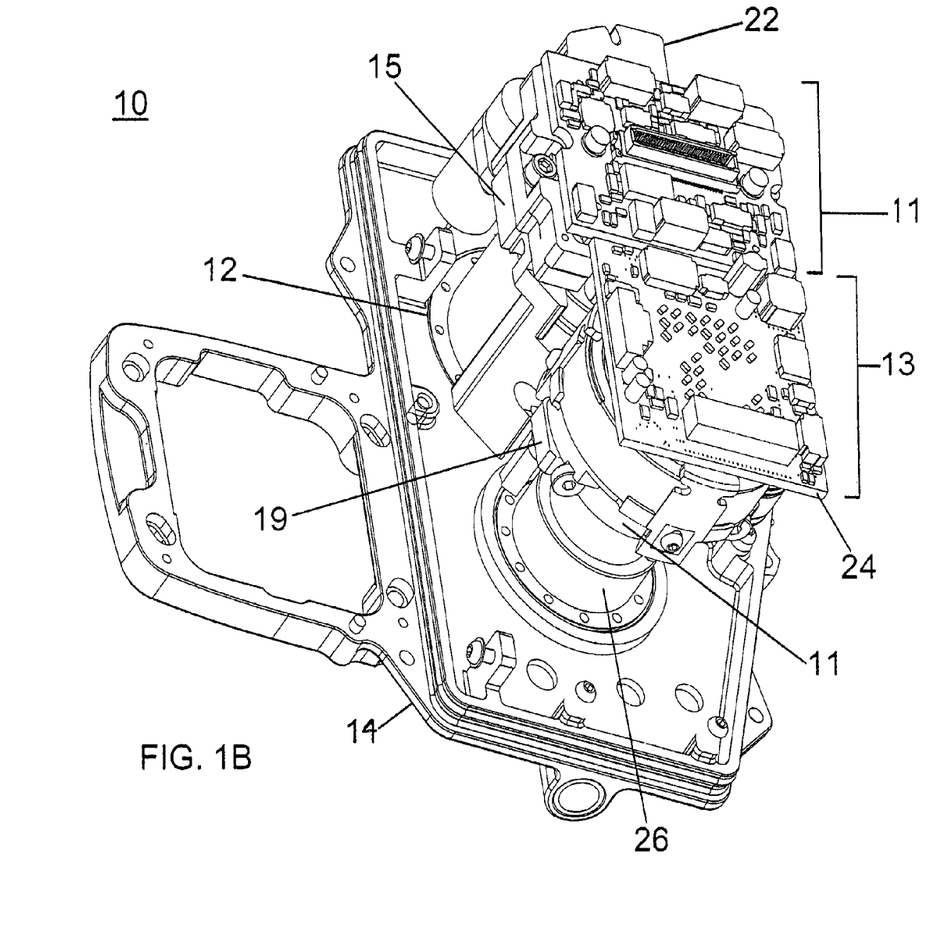
FIG. 1B is a rear perspective view from the bottom right of the night vision optical device of FIG. 1A.
Figure 1C:
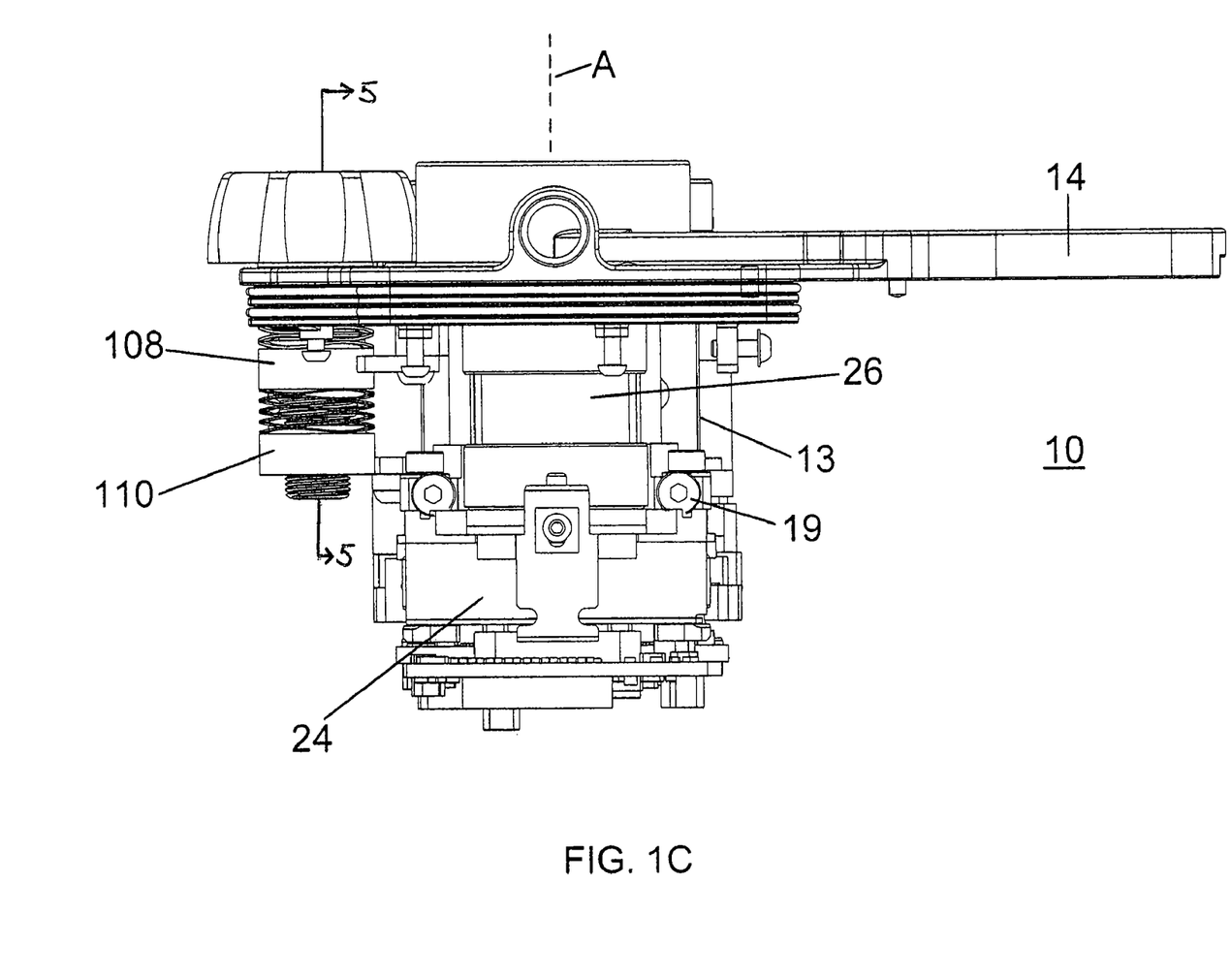
FIG. 1C is a bottom plan view of the night vision optical device of FIG. 1A.
Figure 1D:
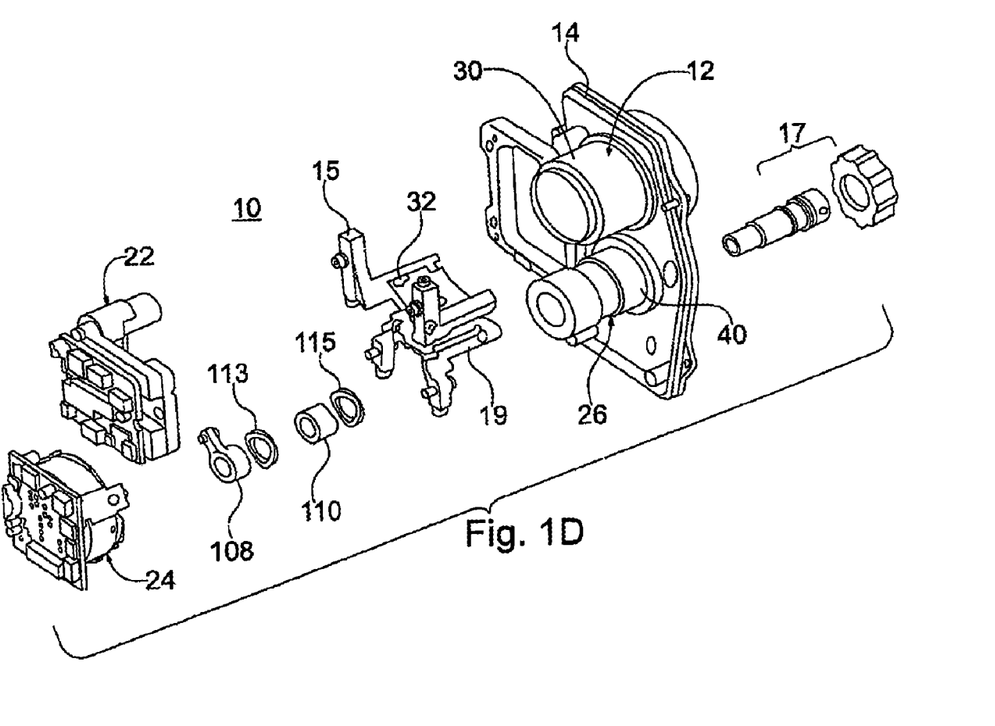
FIG. 1D is an exploded view of the night vision optical device of FIG. 1A.

The first channel 11 generally includes an image detector 22, a complementary objective lens assembly 12 including an objective lens 8 that is adapted to transmit a scene image in a first spectral band, and a carriage assembly 15 that is adapted to translate image detector 22 with respect to complementary objective lens 8 along axis A (see FIG. 1C). The image detector 22 is optionally an infrared detector, for example. In operation, the carriage assembly 15 is configured to translate with respect to the objective lens 8. The image detector 22 is fixed to carriage assembly 15 by a series of threaded fasteners (not shown) and translates along with the carriage assembly 15. Adjustment of the axial distance between image detector 22 and its complimentary objective lens 8 changes the focus of the first channel 11.

The second channel 13 generally includes another image detector 24, a complementary objective lens assembly 26 including an objective lens 9 that is adapted to transmit the same scene image in a second spectral band, and a carriage assembly 19 that is adapted to translate the image detector 24 with respect to its complementary objective lens 9 along axis A (see FIG. 1C). The image detector 24 may be an intensifier assembly or image intensifier camera, for example. Similar to channel 11, the image detector 24 is fixed to carriage assembly 19 by a series of threaded fasteners (not shown) such that image detector 24 translates along with the carriage assembly 19. Adjustment of the axial distance along axis 'A' between the image detector 24 and its complimentary objective lens 9 changes the focus of the second channel 13.

Each objective lens assembly 12 and 26 is threadedly engaged and fixed onto a threaded hole provided in a faceplate 14. According to this exemplary embodiment of the invention, the objective lenses 8 and 9 are stationary, fixed and incapable of movement with respect to faceplate 14. As shown in FIG. 1A, the glass lens of each objective lens 8 and 9 is exposed to the environment and visible from the front plane of device 10. Although not shown in FIGS. 1A-1D, the device 10 includes a housing that is mounted to the faceplate 14 for encapsulating the interior components of device 10.

A focus mechanism 17 is rotatably mounted to faceplate 14. Rotation of the focus mechanism 17 induces simultaneous translation of carriage assemblies 15 and 19. As noted previously, translation of the carriage assemblies 15 and 19 induces translation of the image detectors 22 and 24 relative to their complimentary objective lenses 8 and 9, respectively. Thus, rotation of focus mechanism 17 in either a clockwise or counterclockwise direction simultaneously adjusts the focus of both channels 11 and 13. Further details of the focus mechanism 17 are described with reference to FIGS. 5, 6A and 6B.

Figure 2A:
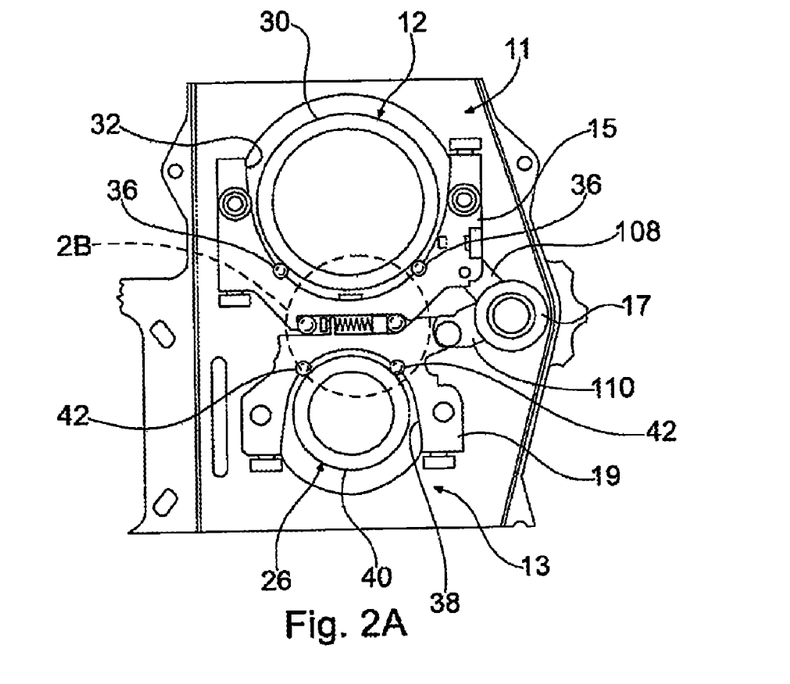
FIG. 2A is a rear elevation view of a sub-assembly of the night vision optical device of FIG. 1A, wherein the image detectors are omitted to show the engagement between the carriages of the channels and their respective objective lenses.

FIG. 2A is a rear elevation view of a sub-assembly of the night vision optical device 10 of FIGS. 1A-1D. The image detectors 22 and 24 and various other components have been omitted from FIG. 2A to depict the engagement between the carriage assemblies 15 and 19 of the channels and their complimentary objective lenses 8 and 9, respectively. The carriage assembly 15 includes a semi-cylindrical surface 32 which is positioned to face a cylindrical surface 30 of the objective lens assembly 12 (see also FIG. 1D). A set of ball bearings 36 are positioned at the interface between the cylindrical surfaces 30 and 32 of the carriage assembly 15 and the objective lens assembly 12 to guide translation of the carriage assembly 15 over the objective lens assembly 12.

Similarly, the carriage assembly 19 of the second channel 13 includes a semi-cylindrical surface 38 which is positioned to face a cylindrical surface 40 of the objective lens assembly 26. A set of ball bearings 42 are positioned at the interface between the cylindrical surfaces 38 and 40 of the carriage assembly 19 and the objective lens assembly 26 to guide translation of the carriage assembly 19 over the objective lens assembly 26. The ball bearings 36 and 42 permit the carriage assemblies 15 and 19 to smoothly translate over their complimentary objective lens assemblies 12 and 26, respectively.

Figure 2B:
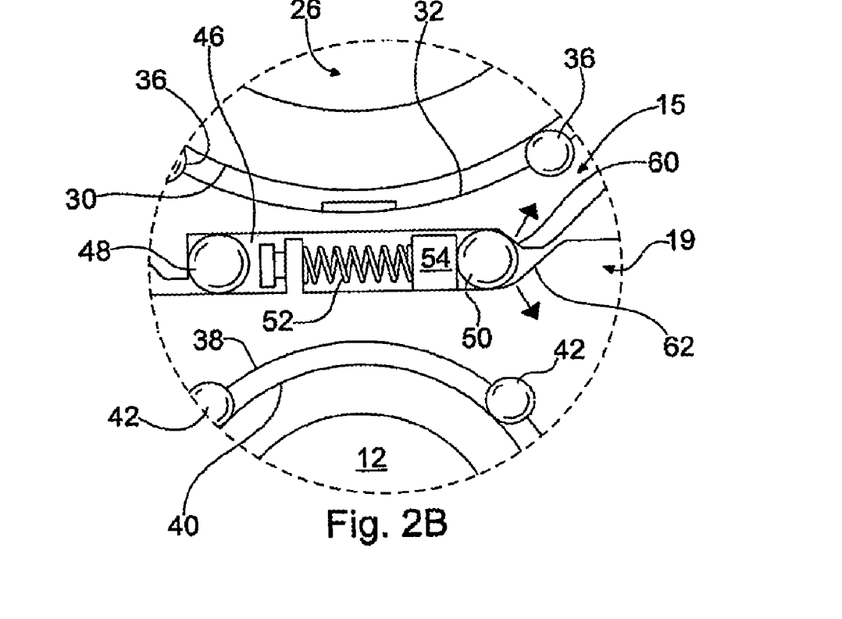
FIG. 2B is a detailed view of the sub-assembly of FIG. 2A.

FIG. 2B is a detailed view of the sub-assembly of FIG. 2A. As best shown in FIG. 2B, a pocket 46 is defined between the undersides of the carriage assemblies 15 and 19. At one end of the pocket 46 is a set of ball bearings 48 (one shown) and at the opposite end of the pocket 46 is another set of ball bearings 50 (one shown). The ball bearings 48 and 50 enable the carriage assembly 15 to smoothly slide along the carriage assembly 19, and vice versa, such that the carriage assemblies 15 and 19 can translate with respect to each other. As will be described in greater detail later, because the carriage assemblies 15 and 19 translate at different speeds and may be independently translated by an end-user, the carriage assemblies 15 and 19 are configured to slide past each other.

A resilient member 52 is configured to urge a block 54 against the ball bearings 50. The ball bearings 50 urge the cylindrical surfaces 32 and 38 of the carriage assemblies 15 and 19 toward the cylindrical surfaces 30 and 40 of the objective lens assemblies 12 and 26. The oblique surfaces 60 and 62 defined on the carriage assemblies 15 and 19, respectively, are designed to urge the carriage assemblies 15 and 19 in the directions depicted by the arrows illustrated in FIG. 2B, i.e., toward the cylindrical surfaces 30 and 40 of the objective lens assemblies 12 and 26.

The resilient member 52, the oblique surfaces 60 and 62, and the ball bearings 50 function together to urge the cylindrical surfaces 32 and 38 of the carriage assemblies 15 and 19 toward the cylindrical surfaces 30 and 40 of the objective lens assemblies 12 and 26 to eliminate play in the channels 11 and 13, respectively. Excessive play between the carriage assemblies 15 and 19 and the objective lens assemblies 12 and 26, respectively, is detrimental because the play manifests itself as an error between overlaid images.

Figure 3:
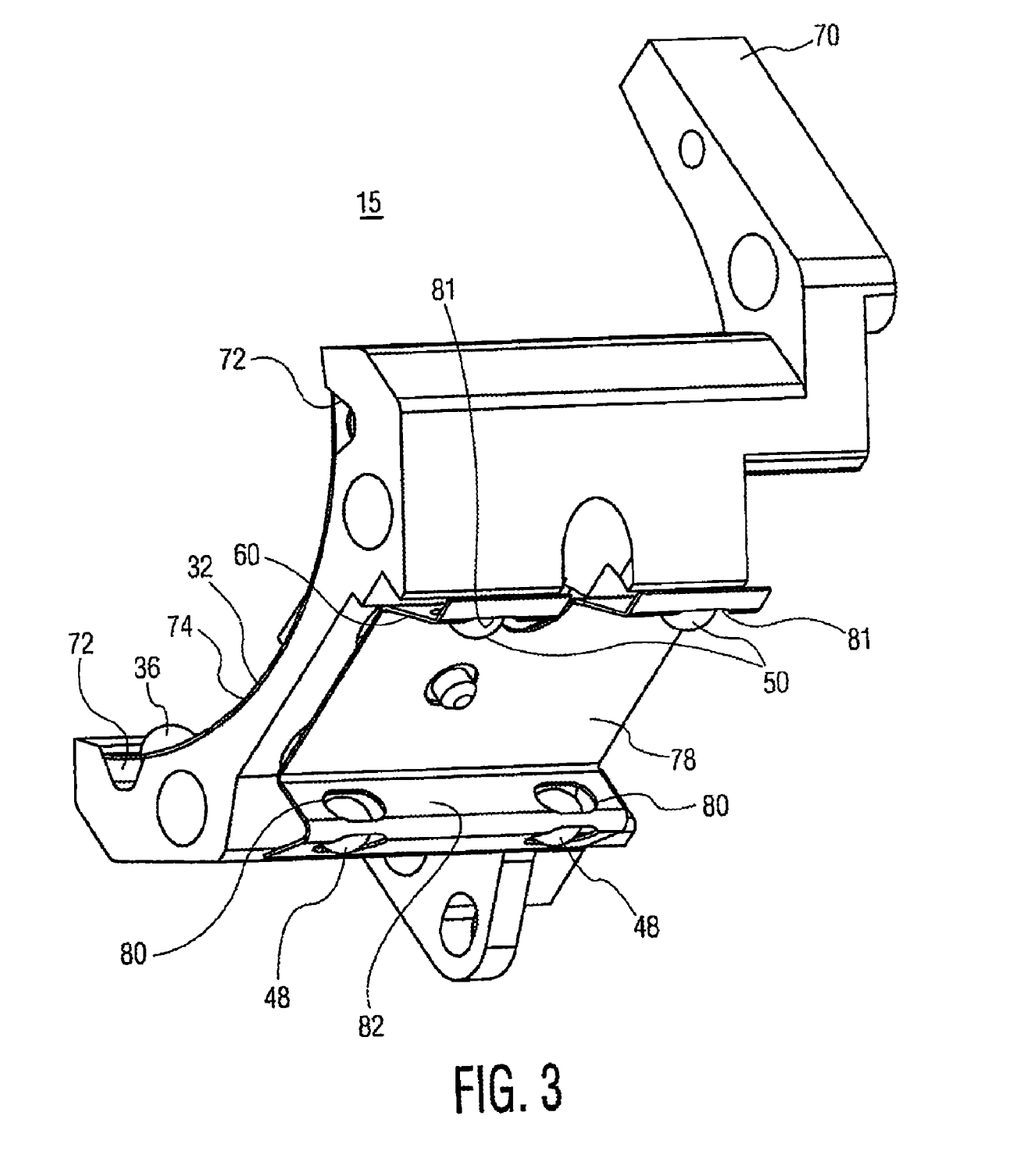
FIG. 3 is a perspective view of the carriage assembly of the first channel.

FIG. 3 is a perspective view of the carriage assembly 15 of the first channel 11. The carriage assembly 15 generally includes a carriage 70, two sets of bearings 36 and 48, and two bearing sleeves 74 and 78 that are each fixedly mounted to the carriage 70 for retaining the bearing sets 36 and 48 in place, respectively. The carriage 70 includes the semi-cylindrical surface 32 and two recesses 72 are formed on opposite ends of the semi-cylindrical surface 32. The ball bearings 36 are positioned in the recesses 72. The bearing sleeve 74 is fixed to the semi-cylindrical surface 32. Although not shown, holes are provided in the sleeve 74 to accommodate the ball bearings 36, such that the ball bearings 36 protrude from the semi-cylindrical surface 32, as shown. The holes provided in the sleeve 74 are small enough to retain the ball bearings 36 in their respective recesses 72, but large enough to permit rotation of the ball bearings 36 within their respective recesses 72. The ball bearings 36 enable the carriage assembly 15 to smoothly slide along the cylindrical surface 30 of the objective lens assembly 12 of optical channel 11.

The bearing sleeve 78 is mounted to the underside of the carriage 70. Holes 80 and 81 are provided in the bearing sleeve 78 to accommodate the ball bearings 48 and 50, respectively. The holes 80 and 81 provided in the sleeve 78 are small enough to retain the ball bearings 48 and 50 in a substantially fixed position, but large enough to permit rotation of the ball bearings 48 and 50. The ball bearings 48 and 50 enable the carriage assembly 15 to smoothly slide over carriage assembly 19. The ball bearings 48 and 50 protrude from the sides 82 and 60, respectively, of the sleeve 78. Side 82 of the sleeve 78 is substantially vertical, whereas the opposing side 60 of sleeve is oblique with respect to side 82. The purpose of the oblique side 60 was described previously with respect to FIG. 2B.

Figure 4:
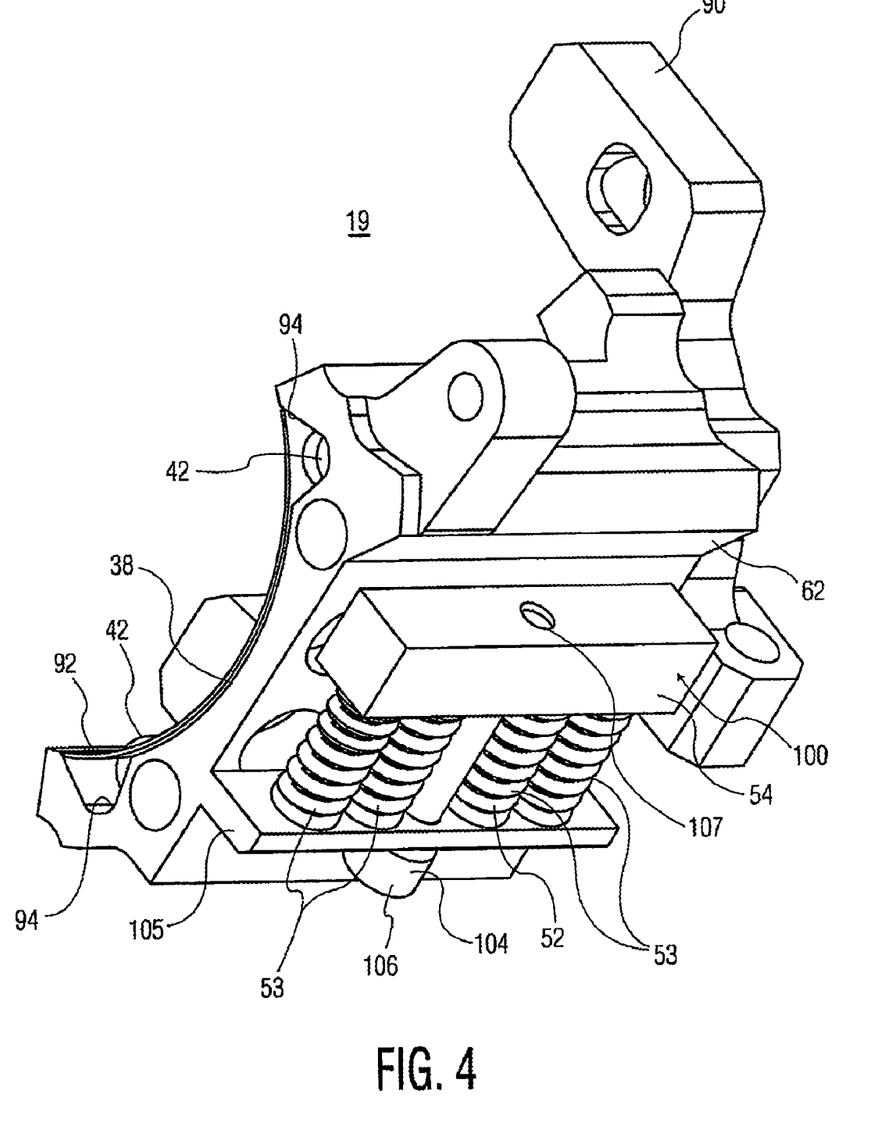
FIG. 4 is a perspective view of the carriage assembly of the second channel.

FIG. 4 is a perspective view of the carriage assembly 19 of the second optical channel 13. The carriage assembly 19 generally includes a carriage 90, a set of ball bearings 42, a bearing sleeve 92 fixedly mounted to the carriage 90 for retaining the ball bearings 42 in place, and a resilient assembly 100 mounted to the underside of the carriage 90 that is configured to engage the carriage assembly 15 of the first channel. The carriage 90 includes the semi-cylindrical surface 38 and two recesses 94 formed on opposite ends of the semi-cylindrical surface 38. The ball bearings 42 are positioned in the recesses 94. The bearing sleeve 92 is fixed to the semi-cylindrical surface 38. Although not shown, holes are provided in the sleeve 92 to accommodate the ball bearings 42. The ball bearings 42 protrude from the holes formed in the sleeve 92, as shown. The holes provided in the sleeve 92 are small enough to retain the ball bearings 42 in their respective recesses 94, but large enough to permit rotation of the ball bearings 42 within their respective recesses 94. The ball bearings 42 enable the carriage assembly 19 to smoothly slide to smoothly slide along the cylindrical surface 40 of the objective lens assembly 26 of optical channel 13.

The resilient assembly 100 is mounted to the underside of the carriage 90 and is configured to engage the carriage assembly 15 of the first channel. In an assembled form of the optical device 10, the ball bearings 48 of the carriage assembly 15 are positioned against a flange 105 of the carriage 90. The ball bearings 50 of the carriage assembly 15 are positioned between the block 54 and the oblique surface 62, as shown in FIG. 2B. As noted previously, the ball bearings 48 and 50 enable the carriage assemblies 15 and 19 to slide past each other.

The resilient assembly 100 comprises the block 54, a pin 104 and a resilient member 52 provided in the form of four springs 53. The cylindrical body of the pin 104 is positioned through a hole defined in the flange 105 of the carriage 90 and a hole 107 in the block 54. The block 54 slides along the cylindrical body of the pin 104. The head 106 of the pin 105 is either mounted to or positioned on the flange 105. The springs 53 are positioned between the block 54 and the flange 105 to urge the block 54 in a direction toward the oblique surface 62. Although not shown, the springs 53 may be fixedly mounted to the block 54. As noted with respect to FIG. 2B, the block 54 urges the ball bearing 50 toward the oblique surfaces 60 and 62, which, in turn, biases the carriage assemblies 15 and 19 against their complimentary objective lens assemblies 12 and 26, respectively.

Figure 5:
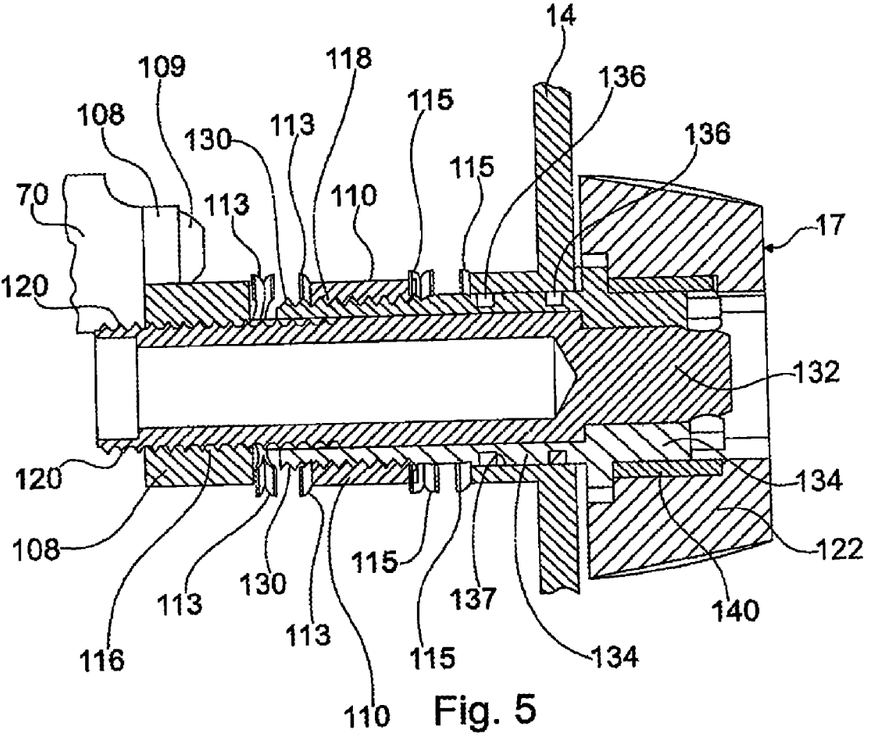
FIG. 5 is a cross-sectional view of the night vision optical device of FIG. 1C taken along the lines 5-5 illustrating engagement between the focus mechanism and the carriages of each channel.

FIG. 5 depicts a cross-sectional view of the night vision optical device of FIG. 1C taken along the lines 5-5 illustrating the threaded engagement between the focus mechanism 17 and the carriage assemblies 15 and 19. As shown in FIGS. 1C, 2A and 5, each carriage assembly 15 and 19 includes a threaded collar 108 and 110 that is fixedly mounted to the carriage 70 and 90, respectively, by a mechanical fastener 109 (one fastener shown in FIG. 5). The collars 108 and 110 may be separate from the carriages 70 and 90, as shown, or may be integrated with the carriages 70 and 90.

As best shown in FIG. 5, each threaded collar 108 and 110 includes a threaded hole including female threads 116 and 118. The female threads 116 and 118 of the collars 108 and 110 are threadedly engaged with the male threads 120 and 130 of the focus mechanism 17, respectively. Rotation of the focus mechanism 17 causes translation of threaded collars 108 and 110 along the length of the focus mechanism 17. Because threaded collars 108 and 110 are fixed to the carriages 70 and 90, rotation of the focus mechanism 17 translates threaded collars 108 and 110 which translates the carriage assemblies 15 and 19 and the image detectors 22 and 24, thereby adjusting the focus of channels 11 and 13, respectively. A spring 113 is positioned between the threaded collars 108 and 110 and another spring 115 is positioned between the threaded collar 110 and the faceplate 14 to prevent or limit rotational backlash of the focus mechanism 17.

Figure 6A:
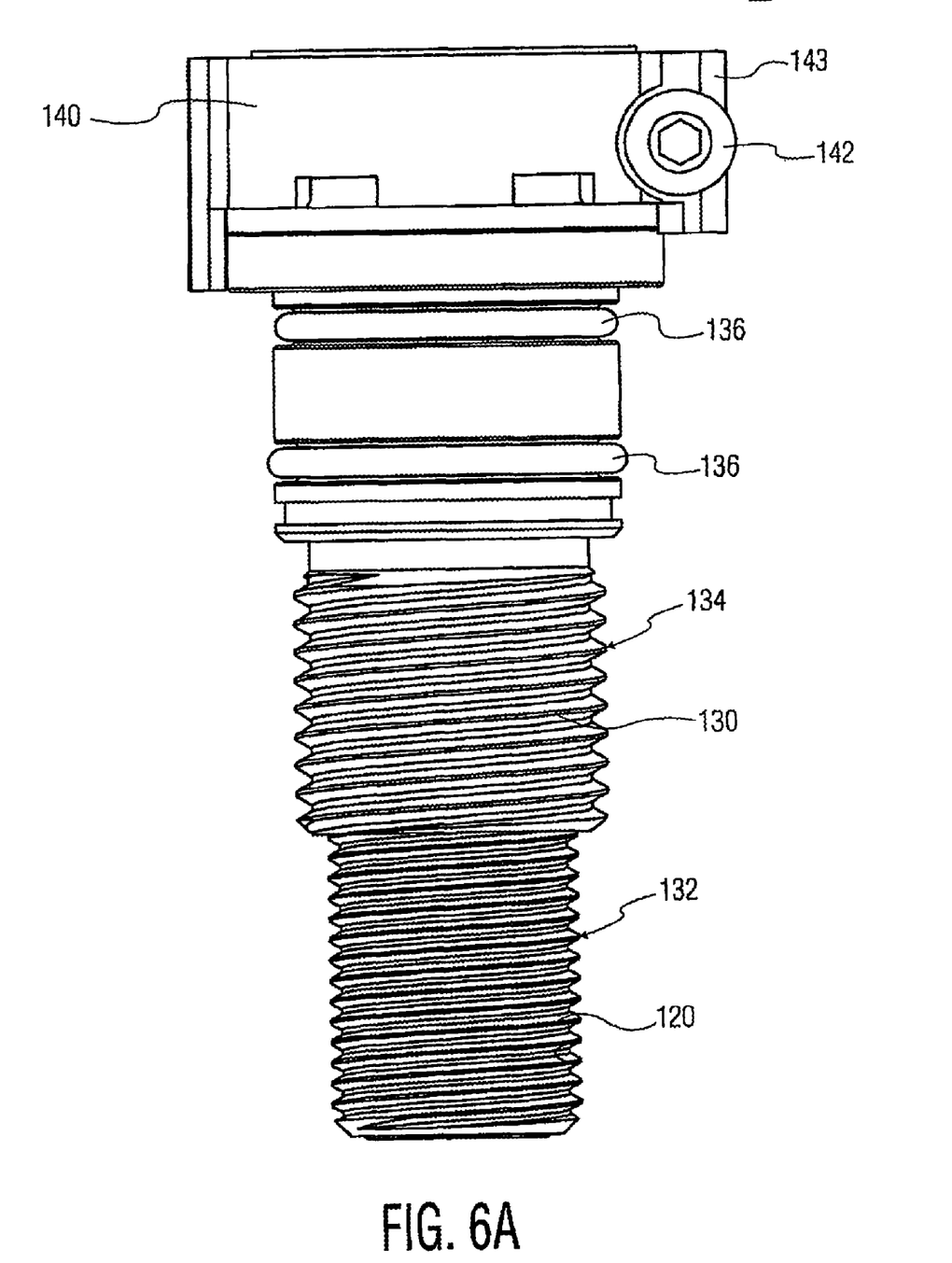
FIG. 6A is a top plan view of the focus mechanism of the multi-channel night vision optical device of FIG. 1A, wherein the hand-wheel is omitted.
Figure 6B:
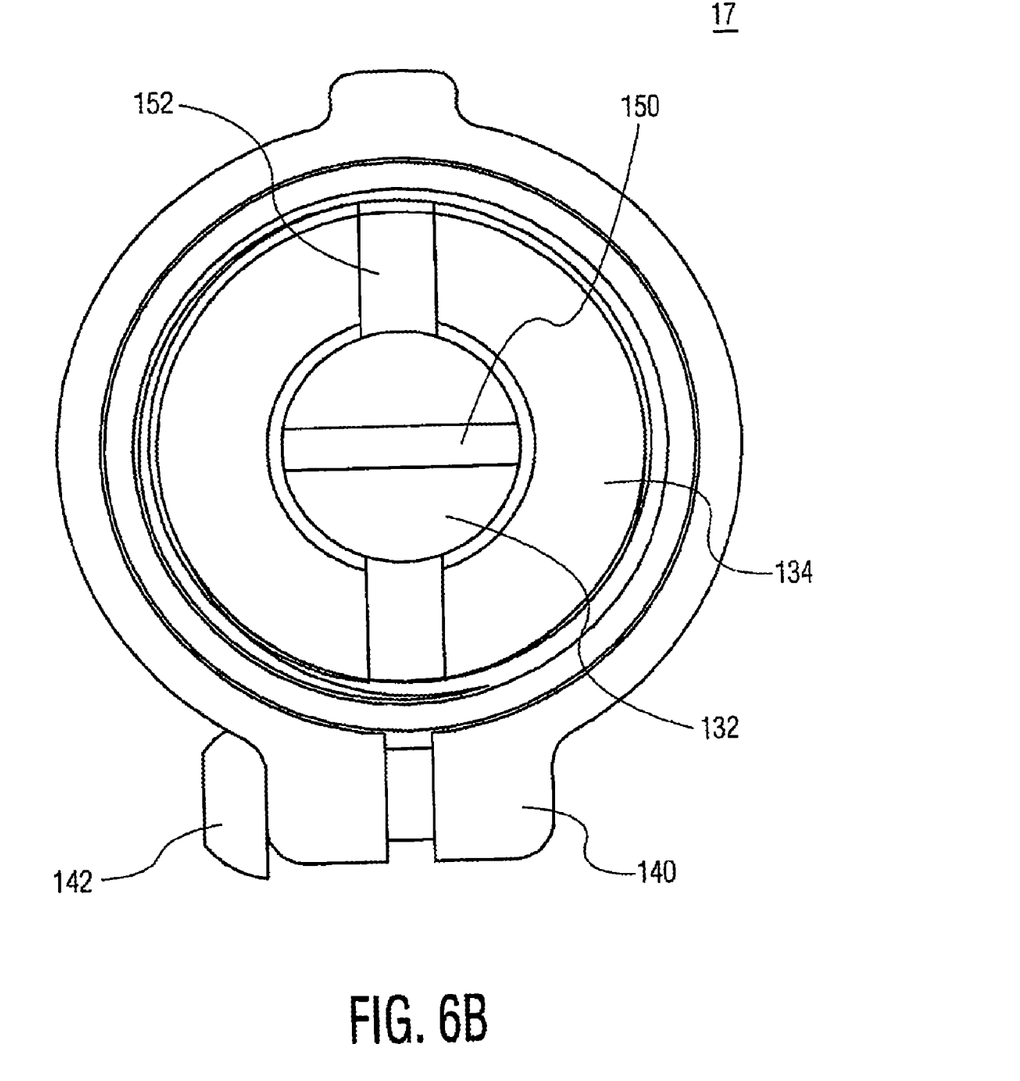
FIG. 6B is a front elevation view of the focus mechanism of FIG. 6A.

FIGS. 6A and 6B depict top plan and front elevation views, respectively, of the focus mechanism 17 of the multi-channel night vision optical device 10 of FIG. 1A. Referring now to FIGS. 5, 6A and 6B, the focus mechanism 17 generally comprises an interior fastener 132 that is positioned within a bore defined in an exterior fastener 134, an adjustable collar 140 mounted to the exterior fastener 134, and a knob 122 mounted to the exterior fastener 134. The knob 122 of the focus mechanism 17 is positioned on the exterior of the optical device 10 such that it is accessible to an end-user. The knob 122 of the focus mechanism 17 is omitted in FIGS. 6A and 6B to reveal the adjustable collar 140.

The focus mechanism 17 is positioned through an aperture 137 provided in the faceplate 14 of the optical device 10. As best shown in FIG. 5, two o-rings 136 are positioned on the exterior fastener 134 to contact an exposed surface of the aperture 137 of the faceplate 14 to limit or prevent the entry of contaminants through the aperture 137 of the faceplate 14 and into the interior of the device 10.

The interior fastener 132 of the focus mechanism 17 is a cylindrical body having male threads 120 defined along a portion of its length. The exterior fastener 134 is also a cylindrical body having male threads 130 defined along a portion of its length. As noted previously, each threaded collar 108 and 110 includes female threads 116 and 118 that are threadedly engaged with the male threads 120 and 130 of the focus mechanism 17, respectively.

The thread pitch of the fasteners 132 and 134 and/or the collars 108 and 110 directly effects the speed at which the threaded collars 108 and 110 translate over the fastener 132 and 134, respectively. According to this exemplary embodiment, the thread pitch of the male thread 120 is substantially equal to the thread pitch of the female thread 116, and the thread pitch of the male thread 130 is substantially equal to the thread pitch of the female thread 118. The thread pitch of the male thread 120, however, differs from the thread pitch of the male thread 130. It follows that the thread pitch of the female thread 116 also differs from the thread pitch of the female thread 118. By virtue of the dissimilar thread pitch of the male threads 120 and 130, the threaded collars 108 and 110 do not translate at the same rate even though the interior fastener 132 and the exterior fastener 134 may rotate at an equal rate. In other words, the thread pitch of the fastener 132 and 134 effects the focus speed of the channels 11 and 13, respectively.

Although manual focusing of the channels 11 and 13 has been described herein, it is envisioned that a motor or other mechanized apparatus may be coupled to the focus assembly 17 for automated focusing of the channels 11 and 13 of the device 10. The mechanized apparatus may be a high accuracy, low power, piezo-electric motor or other similar drive that is suitable for a low-friction system such as device 10.

Referring still to FIGS. 5, 6A and 6B, an adjustable collar 140 is fastened around the portion of the exterior fastener 134 that is disposed beneath the knob 122. The adjustable collar 140 includes a screw 142 mounted to the flange 143 of the collar 140 for adjusting the compressive force applied by the collar 140 onto the fasteners 132 and 134. In operation, tightening the screw 142 compresses the interior surface of the exterior fastener 134 against the exterior surface of the interior fastener 132, consequently fixing the fasteners 132 and 134 together, such that rotation of fastener 134 causes simultaneous rotation of fastener 132. Loosening the screw 142 releases the exterior fastener 134 from the interior fastener 132, thereby enabling independent rotation of the fasteners 132 and 134, the purpose of which is described later.

The knob 122 is removably coupled to the collar 140. The protruding flange 143 of the collar 140 is positioned within a slot (not shown) formed in the knob 122 thereby indexing or keying the knob 122 to the slot of the knob 122. Accordingly, rotation of the knob 122 causes rotation of the entire focus assembly 17, i.e., the collar 140 and the fasteners 132 and 134. Accordingly, rotation of the knob 122 translates the image detectors 22 and 24 with respect to their complimentary objective lenses 8 and 9 thereby changing the focus setting of the channels 11 and 13, respectively.

The fasteners 132 and 134 include slots 150 and 152, respectively, that are sized to receive the tip of a Phillips screwdriver. The slots 150 and 152 are provided for manual adjustment of the relative focus of channels 11 and 13. In use, to adjust the relative focus of channels 11 and 13, an end-user first removes the knob 122 from the collar 140, loosens the screw 142 and rotates the fastener 132 and/or the fastener 134 with a Phillips screwdriver (by way of slots 150 and 152) to adjust the respective focus of the channels 11 and 13, respectively.

For example, rotating the slot 150 would translate collar 108, while collar 110 remained stationary, thereby changing the focus of channel 11 with respect to channel 13. Alternatively, rotating the slot 152 would translate collar 110, while collar 108 remained stationary, thereby changing the focus of channel 13 with respect to channel 11. It should be understood that rotation of fastener 132 translates the threaded collar 108 which translates image detector 22 with respect to its complimentary objective lens 8, whereas rotation of fastener 134 translates the threaded collar 110 which translates image detector 24 with respect to its complimentary objective lens 9.

Once the relative focus of the channels 11 and 13 is set, the user tightens the screw 142 of the collar 140 to secure the fasteners 132 and 134 together and mounts the knob 122 to the collar 140. Unlike convention ganged focus mechanisms, the relative focus of the channels may be adjusted from the exterior of the optical system without dissembling the entire optical system or a significant proportion thereof.

Objective lenses 8 and 9 are separated by a vertical distance as shown in FIG. 1A. One skilled in the art will understand that the vertical separation introduces a parallax disparity, which is an inherent problem in most multiple channel optical systems. Superimposing the images projected through the channels upon one another (i.e. overlay) causes the parallax disparity to manifest itself as a mismatch of the two images. The mismatch of the images is proportional to the degree of separation between the objective lenses relative to the distance between the optical device and the object being observed.

The ganged focus mechanism provides a reference for positional disparity between the objective lenses that can be used as an input for parallax correction in either a mechanical, analog or digital imaging system. A positioning feedback device may be coupled to the device 10 to provide parallax adjustment throughout the entire focus range. The positional feedback device may be, for example, a strain gage, a hall-effect device, or an encoder, to measure the distance between an objective lens and its complimentary image detector. This measurement is used to derive the focal distance (i.e. the distance to the subject being imaged) of multiple channels and to provide an input to a table, algorithm or mechanism that can shift either one or more of the image detectors themselves or their output images to a prismatic display device (not shown). In this manner, an object viewed at infinity through two channels would appear on the display as a singular image comprising two superimposed images. As the object moves closer the separation of the two channels would normally become apparent as an overlay mismatch on the prismatic display. The input from the feedback device of this exemplary embodiment would provide an open-circuit instruction for the imaging system to compensate for the parallax disparity. The digital imaging system cooperates with the positional feedback device to vertically shift one image relative to the other image by the appropriate number of pixels on the prismatic display to compensate for the parallax disparity. The mechanical, analog or digital imaging system may also be adapted to translate the image displayed on the prismatic display horizontally to compensate for a lateral displacement error.

Although the optical device 10 is intended for use with a monocular night vision system, it may also be used with a binocular night vision system or any other optical system such as a multiple, wave specific cameras, intensifiers, telescopes, range finders, projectors and 3-D simulators. The optical device 10 may be useful for one or more of the following industries or applications: entertainment, automotive, medical, military, food processing, pharmaceutical, and product handling, for example.

Although the invention is illustrated and described herein with reference to specific embodiments, the invention is not intended to be limited to the details shown. Rather, various modifications may be made in the details within the scope and range of equivalents of the claims and without departing from the invention. For example, although the image detectors 22 and 24 translate along the stationary objective lenses in practice, in another embodiment not illustrated herein, the image detectors that are maintained in a stationary position and the objective lenses translate along a surface of the image detectors. Furthermore, the optical device is not limited to the infrared detector 22 and image intensifier assembly 24, as any wavelength detector or image intensifier may be used with the device.

What is claimed:

1. An optical device for viewing an image comprising:
   two optical channels positioned adjacent one another, each optical channel including an image detector assembly and a associated objective lens assembly spaced by a respective distance from the image detector assembly, wherein the objective lens assembly includes an objective lens and the image detector assembly includes an image detector; and
   each objective lens assembly including a translation surface that is positioned to face a translation surface of its associated image detector assembly; and
   a resilient member positioned to bias the translation surface of each image detector assembly toward a translation surface of its associated objective lens assembly,
   wherein upon translation of each objective lens with respect to its associated image detector, the resilient member continuously biases the translation surface of each image detector assembly toward the translation surface of the associated objective lens such that a longitudinal axis of each image detector remains substantially parallel to a longitudinal axis of its associated objective lens as each image detector translates with respect to its associated objective lens assembly; and
   further comprising a ball bearing positioned between the image detector assemblies, wherein the resilient member is configured to bias the ball bearing in a direction biasing the translation surface of each image detector assembly toward the translation surface of its associated objective lens; and
   a pocket defined between the image detector assemblies, wherein the ball bearing and the resilient member are positioned within the pocket.

2. The optical device of claim 1 wherein the resilient member includes one or more resilient springs.

3. The optical device of claim 1, wherein the ball bearing is positioned at a first end of the pocket and another ball bearing is positioned at an opposite end of the pocket, wherein said another ball bearing is not positioned to be biased by the resilient member.

4. The optical device of claim 1, wherein the pocket is defined by two oblique surfaces and the resilient member is positioned to bias the ball bearing against both oblique surfaces of the image detector assemblies.

5. The optical device of claim 1, wherein the translation surfaces are substantially cylindrical.

6. The optical device of claim 1 wherein one of said image detectors is an image intensifier ($I^2$).

7. The optical device of claim 1 wherein one of said image detectors is an infrared device (IR).

* * * * *